(12) United States Patent
Xiong

(10) Patent No.: US 9,218,814 B2
(45) Date of Patent: Dec. 22, 2015

(54) CROSS MONITORING METHOD AND SYSTEM BASED ON VOICEPRINT RECOGNITION AND LOCATION TRACKING

(75) Inventor: Dianyuan Xiong, Shanghai (CN)

(73) Assignee: Dianyuan Xiong, Union City, CA (US)

( * ) Notice: Subject to any disclaimer, the term of this patent is extended or adjusted under 35 U.S.C. 154(b) by 926 days.

(21) Appl. No.: 13/501,245

(22) PCT Filed: Sep. 25, 2010

(86) PCT No.: PCT/CN2010/077252
§ 371 (c)(1),
(2), (4) Date: Jun. 11, 2012

(87) PCT Pub. No.: WO2011/041977
PCT Pub. Date: Apr. 14, 2011

(65) Prior Publication Data
US 2012/0249328 A1    Oct. 4, 2012

(30) Foreign Application Priority Data
Oct. 10, 2009  (CN) .......................... 2009 1 0196988

(51) Int. Cl.
*G08B 21/00* (2006.01)
*G10L 17/22* (2013.01)
(Continued)

(52) U.S. Cl.
CPC ................ *G10L 17/22* (2013.01); *G08B 21/22* (2013.01); *G10L 15/22* (2013.01)

(58) Field of Classification Search
CPC ....... H04M 11/00; H04M 1/64; H04M 15/00; H04L 9/00; G08B 13/24; G08B 29/00; G08B 1/123; G08B 21/00; H04W 24/00; H04W 4/00; G10L 17/00; H04Q 7/38
USPC ........... 340/506, 572.4, 573.1; 455/466, 423, 455/445, 410; 379/88.04, 88.02, 32.05; 704/246, 273; 713/186; 702/186; 709/246, 229; 705/22; 70/91
See application file for complete search history.

(56) References Cited

U.S. PATENT DOCUMENTS 5,786,764 A * 7/1998 Engellenner ................ 340/572.4
6,522,265 B1 * 2/2003 Hillman et al. ................ 340/988
(Continued)

*Primary Examiner* — Jeffery Hofsass

(57) ABSTRACT

The invention discloses a cross monitoring method and system based on voiceprint recognition and location tracking, belonging to the field of monitoring systems. The invention collects personal information and voice samples of a monitored individual and constructs a voiceprint model thereof, and collects location information thereof and voiceprint information through a positioning communication device and/or wireless communication network service, which are compared with the stored information in a repository; output a complete report reflecting the human body movement trace and actual non-compliance with the restrictions for a supervisory staff or other person of authority to inspect and evaluate the performance of the monitored individual. The supervisory staff can request and evaluate the statistical analysis report concerning the activity performance of the monitored individual, observe the movement trace and the state thereof, and/or adjust the monitoring scheme thereof according to the performance. The invention realizes the remote location tracking of the monitored individual, also realizes non-contact biological identity recognition of the monitored individual and satisfies the need of remote and non-contact monitoring of the monitored individual. The invention can be widely applied to the non-contact electronic monitoring and identity recognition field.

19 Claims, 5 Drawing Sheets

(51) Int. Cl.
  *G10L 15/22*  (2006.01)
  *G08B 21/22*  (2006.01)

(56) References Cited

U.S. PATENT DOCUMENTS

| | | | | |
|---|---|---|---|---|
| 6,829,478 | B1* | 12/2004 | Layton et al. | 455/428 |
| 7,206,385 | B2* | 4/2007 | Ethier et al. | 379/32.05 |
| 7,272,565 | B2* | 9/2007 | Mardirossian | 704/273 |
| 7,522,060 | B1* | 4/2009 | Tumperi et al. | 340/573.4 |
| 7,538,667 | B2* | 5/2009 | Koen | 340/539.13 |
| 7,701,328 | B2* | 4/2010 | Wall et al. | 340/506 |
| 8,027,662 | B1* | 9/2011 | Miller et al. | 455/410 |
| 8,073,473 | B2* | 12/2011 | Huggett | 455/466 |
| 8,271,336 | B2* | 9/2012 | Mikurak | 705/22 |
| 8,630,820 | B2* | 1/2014 | Amis | 702/186 |
| 8,700,027 | B2* | 4/2014 | Wilkin et al. | 455/423 |
| 2003/0045317 | A1* | 3/2003 | Pan et al. | 455/518 |
| 2003/0135740 | A1* | 7/2003 | Talmor et al. | 713/186 |
| 2005/0253703 | A1* | 11/2005 | He et al. | 340/539.13 |
| 2006/0020459 | A1* | 1/2006 | Carter et al. | 704/246 |
| 2006/0168259 | A1* | 7/2006 | Spilotro et al. | 709/229 |
| 2006/0286984 | A1* | 12/2006 | Bonner | 455/445 |
| 2007/0073899 | A1* | 3/2007 | Judge et al. | 709/246 |
| 2007/0117554 | A1* | 5/2007 | Arnos | 455/414.4 |
| 2007/0153993 | A1* | 7/2007 | Cohen | 379/100.05 |
| 2007/0271339 | A1* | 11/2007 | Katz | 709/204 |
| 2008/0130842 | A1* | 6/2008 | Johri et al. | 379/88.04 |
| 2008/0182621 | A1* | 7/2008 | Morman | 455/558 |
| 2009/0118002 | A1* | 5/2009 | Lyons et al. | 463/29 |
| 2009/0146846 | A1* | 6/2009 | Grossman | 340/988 |
| 2009/0214004 | A1* | 8/2009 | Caraballo et al. | 379/88.02 |
| 2010/0086108 | A1* | 4/2010 | Jaiswal et al. | 379/88.04 |
| 2010/0305960 | A1* | 12/2010 | Gutierrez et al. | 705/1.1 |
| 2010/0307206 | A1* | 12/2010 | Taylor et al. | 70/91 |
| 2011/0255481 | A1* | 10/2011 | Sumcad et al. | 370/329 |
| 2011/0288866 | A1* | 11/2011 | Rasmussen | 704/246 |
| 2012/0278476 | A1* | 11/2012 | Agrawal et al. | 709/224 |

* cited by examiner

CROSS MONITORING METHOD AND SYSTEM BASED ON VOICEPRINT RECOGNITION AND LOCATION TRACKING

FIELD OF INVENTION

This disclosure is in the field of electronic monitoring, system, and it particularly relates to a cross monitoring method and system for tracking an individual using both biometric recognition for verifying identity and electronic positioning for tracking location together.

BACKGROUND

Relative to the prison correction, community correction may not only reduce execution costs, reduce the state financial input on criminal penalty, avoid prison overcrowding, prevent cross-infection inside the prisons, but also help the criminals rehabilitate and reintegrate into society.

After long-time practice, community correction, as an economical and effective means of criminal correction and education, has widely been developed in major developed countries in the West. Based on foreign empirical data, China has also practiced community correction as a pilot project in various provinces and municipalities, and plans to expand community correction nationally in the near future.

Many countries push part of low-risk criminals (including probation, misdemeanor, parole, and other prisoners) into community for correction, this brings about a technical problem on how to monitor and manage them effectively. Similarly, there has always been a technical issue for an enterprise organization to track and manage its mobile workforce and personnel at work time effectively, such as: corporate sales staff, field technicians, logistics personnel, field patrol staff, and medical care personnel.

With the rapid development of modern communication technologies and positioning technologies, especially the increasing popularity of wireless mobile communication and global satellite positioning devices, it becomes more and more convenient to remotely track a device having capabilities of positioning and communication, and the cost of the location-tracking system is getting lower and lower, these attract a large number of businesses and government organizations to take a strong interest in such remote location-tracking technologies.

DETAILED DESCRIPTION

Technical Problem

Figure 1:
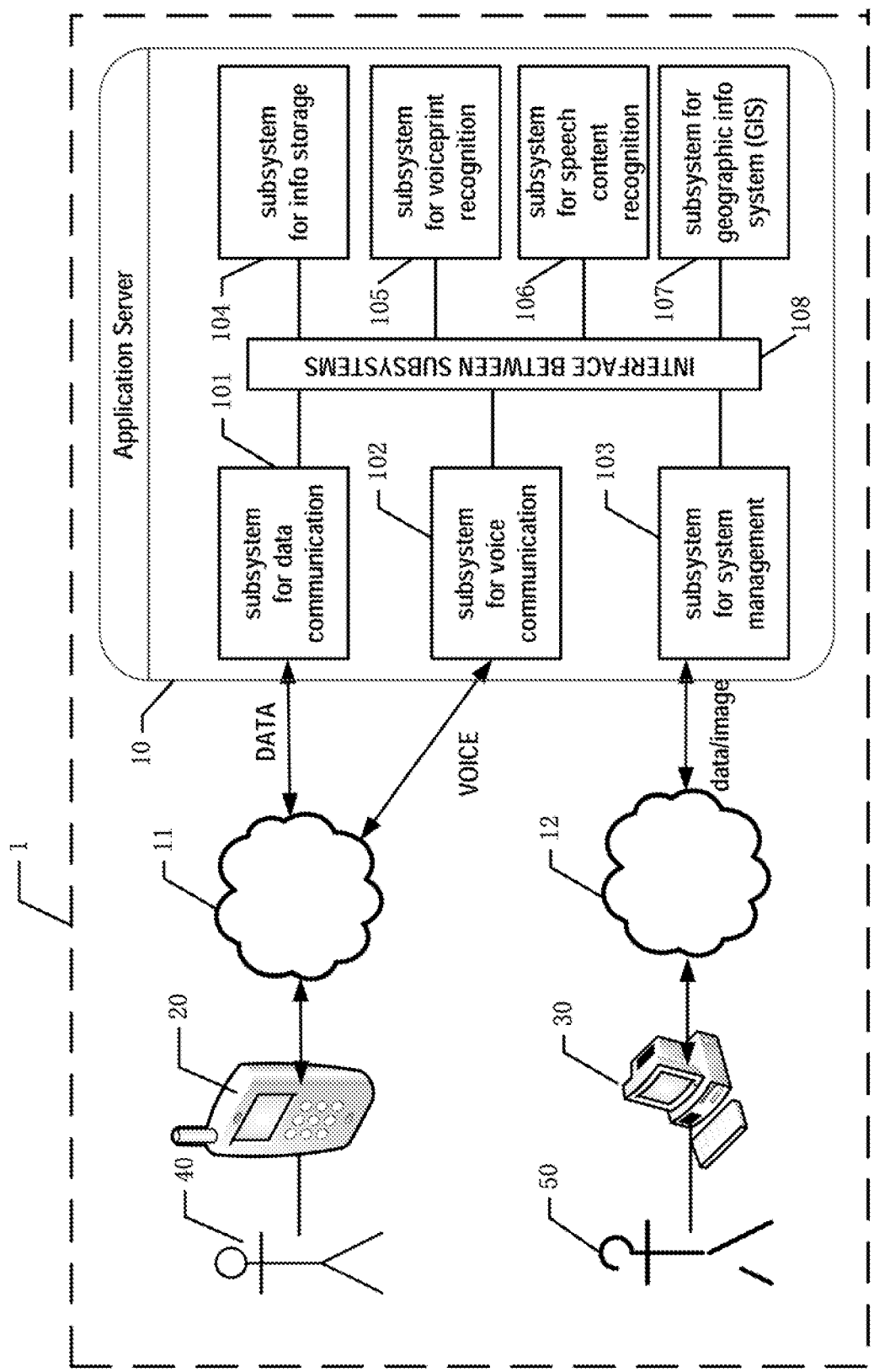
FIG. 1 illustrates an example cross-monitoring system according to one embodiment of the present invention.

At present, the mainstream remote location-defining technologies primarily uses one or more of the following positioning methods to define the location of an object: positioning by base stations of wireless mobile communication network, positioning by satellites, hybrid positioning by satellites and mobile communication base stations, and/or positioning by wireless Wi-Fi access points, and others.

However, regardless of which of the above positioning technology methods, so far its still technically difficult to embed into a human body a personal portable device having capabilities of remote positioning and wireless mobile communication (e.g. mobile telephone, or GPS signal receiver), hence the positioning communication device for tracking an individual usually has to be attached onto the body surface of the individual, or be held closely by the individual.

The positioning communication device for tracking an individual may be detached or discarded accidentally or intentionally, or even worse that the individual asks somebody else (e.g. his or her friends, family members, or coworkers) to hold the tracking device on behalf of him/her on purpose, resulting in decoupling physically between the individual and his/her tracking device, this allows the individual to escape from being monitored by a location-tracking system at any time because the individual might not be present at the location of his/her tracking device.

Essentially, the existing location-tracking methods or systems can track only a location-defining device directly, but they have no way to track directly the location of the individual who is required to hold the device during location tracking. Without assumption that the individual always holds the tracking device during location tracking, the movement trace of the tracking device may not be taken as that of the individual's human body.

Therefore, for tracking an individual with a positioning communication device, the existing location-tracking methods or systems all have a serious deficiency that they can identify only the tracking device but not the person who holds the tracking device, thus fail to detect the case that an individual doesn't stay together with the device for tracking him/her.

Technical Solution

In respect to the above-addressed deficiency of the art in tracking an individual, the present invention provides a cross-monitoring method and system based on voiceprint recognition and location tracking; the method and system can not only track the location of the individual, but also verify the voice biometric identity of the individual in non-contact way, and overcome the serious deficiency of existing location-tracking methods or systems—"identify only a tracking device but not the person holding the tracking device", and satisfies the need of monitoring an individual automatically in a remote and non-contact way by preventing the physically decoupling between the individual and the device designated for tracking the individual.

In the technical solution of the present invention for monitoring an individual's movement, a cross monitoring method based on voiceprint recognition and location tracking comprises the following steps:

A. for a monitored individual, collecting the individual's personal information and voice samples to register the individual's user ID, build the individual's voiceprint model, and designate a positioning communication device specifically for tracking the individual, configure a monitoring scheme and configure an alarming scheme; selecting a unique network ID fully representing the positioning communication device, further establishing a unique one-to-one correspondence between the network ID and the user ID to bind the device and the individual together;

B. for the positioning communication device, executing repeatedly a location tracking step according to the monitoring and alarming schemes, wherein the location-tracking results are processed and stored in a repository;

C. for the monitored individual, executing repeatedly a voice-tracking step based on voiceprint recognition according to the monitoring and alarming schemes, wherein the voice-tracking results are processed and stored in a repository;

D. for the individual and the positioning communication device designated for the individual, conducting a cross statistical analysis on the location-tracking and voice-tracking result records generated within the same time period to compile an overall tracking report on the individual's performance for the specified time period periodically or in response to a report request, wherein the overall tracking report eventually reflects the individual's movement trace and actual non-compliance with restrictions on movement so that a supervisory staff can review the performance and movement of the individual and/or adjust the monitoring and alarming schemes for the individual.

Wherein the above-said monitoring scheme includes some or all of the following items of information: the time schedule and frequency of recurrence of the location-tracking step, the choices on whether the monitoring system requests a location-defining information actively or accept a location-defining information passively, the time and location related movement restrictions imposed on the individual, the time schedule and frequency of recurrence of the voice-tracking step, the choices on whether the individual initiates a voice call actively or receives a voice call passively for voiceprint recognition, choices on mode and content of the system prompt or request versus the individual's oral answer, demand on parallel/interactively-linked execution of the location-tracking and voice-tracking steps, the time schedule to do cross statistical analysis on the monitoring results to compile a tracking report;

the alarming scheme comprises alarm-triggering conditions, alarm-delivering means, and/or alarm-receiving destinations;

if no personalized monitoring and alarming schemes are configured for the individual, the system default monitoring and alarming schemes are adopted for the individual;

further, according to the monitoring and/or alarming schemes of the individual, the location-tracking step and the voice-tracking step may be executed in parallel mode or in interactively-linked mode.

Specifically, the location-tracking step comprises:

using location-defining technological methods to acquire remotely the network ID, geolocation and positioning timestamp of the positioning communication device;

querying the user ID uniquely corresponding to the network ID according to the binding relationship between the user ID and network ID, querying the time and location related movement restrictions imposed on the individual of the user ID, determining whether the individual is compliant with the movement restrictions, wherein an alarm message will optionally be sent to its destinations in the specified alarm-delivering means if the alarm condition is triggered;

further, storing the location-tracking result in a repository where the result record is associated with the user ID;

wherein the location-tracking result includes network ID, geolocation, positioning timestamp and/or the status of alarming and non-compliance with the movement restrictions; the location-defining technological methods include positioning by satellites, positioning by wireless mobile communication base stations, hybrid positioning by both satellites and wireless mobile communication base stations, and/or positioning by wireless Wi-Fi access points; the location-defining technological methods are enabled via the positioning communication device and/or wireless mobile communication network service.

Specifically, the voice-tracking step comprises:

establishing a man-machine interactive voice dialogue, retrieving the network ID of the positioning communication device held by the individual, recording the voice input of the individual in response to the system prompt or request, executing voiceprint recognition process on the recorded voice input to verify the individual's biometric identity;

optionally executing speech recognition process on the recorded voice input in order to further verify that the voice originated from the live speech of a person who is present at the location of the tracking device by checking whether the individual's oral answer matches the system prompt or request during the man-machine interactive voice dialogue;

utilizing the network ID, voiceprint recognition result and/or speech recognition result to determine whether the individual on-site is holding the positioning communication device designated for tracking the individual, and thus determine the individual's status of non-compliance with the restriction that the individual shall hold his or her tracking device all the time;

sending an alarm message to its destinations in the specified alarm-delivering means if the alarm condition is triggered;

further, storing the voice-tracking result in a repository where the result record is associated with the user ID.

Wherein the voice-tracking result includes the network ID, timestamp, the status of alarming and non-compliance with restriction, the voiceprint recognition result and/or speech content recognition result.

In the location-tracking and voice-tracking steps, the execution order doesn't matter between storing the tracking result and sending the alarm message due to non-compliance with restriction.

Specifically, the voiceprint recognition is classified as two phases: voiceprint enrollment and voiceprint verification;

wherein the voiceprint enrollment phase comprises:

extracting voiceprint feature, wherein digital signal processing is performed on the individual's voice samples to extract a voiceprint feature sequence that characterizes the physiological and behavioral characteristics of the individual's speaking;

building voiceprint model, wherein the voiceprint feature sequence extracted from the voice samples is used to build the voiceprint model for characterizing the characteristics of the individual's speaking.

wherein the voiceprint verification phase comprises:

extracting voiceprint feature, wherein digital signal processing is performed on the voice input of the individual to extract a voiceprint feature sequence that characterizes the physiological and behavioral characteristics of the individual's speaking;

matching voiceprint pattern, wherein the voiceprint feature sequence extracted from the voice input is used to compute similarity score of speaker feature against the voiceprint model of the individual for identifying the individual.

The present invention also provides a cross-monitoring system based on the voiceprint recognition and location tracking, which works in accordance with the cross-monitoring method; the cross monitoring system involves an monitored individual and a supervisory staff, wherein the individual is monitored automatically by the monitoring system and supervised by the supervisory staff, and the supervisory staff manages the individual and the operation of the monitoring system; the cross-monitoring system is characterized by:

setting up a positioning communication device, which is attached onto the body surface of the individual or held closely by the individual as a personal portable device;

setting up an application server, which is used to provide the following services: voice communication, data communication, system management, voiceprint authentication, and/or information storage;

setting up an administration operation terminal as a client, which combines with the application server to form the service architecture of Browser-Server or Client-Server; wherein with the administration operation terminal, the supervisory staff may manage the individual's personal information, configure the monitoring scheme, configure the alarming scheme (triggering conditions, delivering means, and message receivers), push notification or command message, receive event notification, observe geolocation and movement trace of the individual and/or review the statistical analysis report on the individual;

wherein the positioning communication device and application server are joined through the first link network, which helps transmit and coordinate voice communication and data communication involving the individual;

wherein the administration operation terminal and application server are joined through the second link network, which helps transmit and transfer data communication and/or voice communication involving the supervisory staff.

Specifically, the positioning communication device having a unique network ID is used for data communication, receives and transmits the positioning signals for location-defining process; it is also used for voice communication, plays back the system prompt or request, collects and transmits the voice input of the individual in response to the system prompt or request during the man-machine interactive voice dialogue;

the application server is either a server comprising a single physical computer, or a virtual server comprising a plurality of physical computers working together harmonically through network connections; the application server includes one or more service subsystems, and may also selectively provide such optional auxiliary services as speech content recognition, text-to-speech synthesis, and geographic information system services.

if the application server comprises multiple computers as a virtual server, the multiple computers can be located centrally in the same local area network, or also be deployed in geographically distributed networks over network connections, they are controlled and coordinated by the system management service.

according to the binding relationship between the user ID of the individual and the network ID of the positioning communication device, the application server utilizes the system management and storage services to do a cross statistical analysis on the location-tracking and voice-tracking result records generated within the same time period to compile an overall tracking report on the movement trace and performance of the individual for the supervisory staff's review.

said first link network is involved in the location-tracking and/or voice-tracking service.

said second link network is involved in the system control and management, display of geolocations and movement trace of the individual, and/or presentation of overall tracking report.

further, said man-machine interactive voice dialogue involves an individual, a positioning communication device and the application server; it allows voice communication to be initiated in two modes: active call-making mode and passive call-taking mode;

in said active call-making mode, an individual actively initiates a voice call to the application server through the positioning communication device bound for the individual, the application server then answers the inbound voice call, detect and identify the network ID of the positioning communication device;

in said passive call-taking mode, the application server queries the network ID uniquely corresponding to an individual's user ID, makes an outbound voice call to the positioning communication device with said network ID; then, the individual holding the positioning communication device answers passively the voice call from the application server.

Advantageous Effects of Invention

Compared with the existing technologies, the present invention has the following advantages:

1. It uses both voiceprint authentication and location tracking to provide double electronic monitoring method and system, wherein in addition to the location-based monitoring on the individual, biometric identification on the individual is also performed in non-contact way; it overcomes the deficiency of the existing location-tracking methods and systems which identify only the tracking device but not the person who holds the tracking device, it also meets the need of monitoring the individual in remote and non-contact way.

2. It not only tracks the movement of the individual, but also randomly or according to the pre-configured schedule, verify whether the individual on-site holds his or her specified positioning communication device in the voiceprint recognition based voice-tracking means; this effectively prevents the individual from staying far away from his or her tracking device for long time in order to escape the electronic monitoring;

furthermore, in respect to voice-tracking by voiceprint authentication, the system-initiated random voice call to an individual is more effective than the individual-initiated active voice call for preventing the physically decoupling between the individual and his/her specified tracking device.

3. It is truly achieved that the location and movement trace of the human body is tracked remotely; this helps an administration office automate the monitoring and management of geographically-distributed large-scale individuals, thus greatly reduce the workload of a supervisory staff, improve efficiency and reliability in supervising the individuals; this can have particularly important applications in the electronic monitoring on the mobile workforce, community correction criminals and the like.

Implementation of the Present Invention

The core idea of the present invention: establish a man-machine interactive voice dialogue, record remotely real-time voice input of an individual's oral answer, do voiceprint recognition and/or speech content recognition on the recorded voice input, identify the biometric identity of the individual, and determine whether the individual holds his or her specified positioning communication device; by the location defining and tracking methods, obtain and store the geolocations and movement trace of the positioning communication device; do a cross statistical analysis on the location-tracking and voice authentication results so as to obtain effectively and reliably the status of non-compliance with the restrictions and the movement trace of the individual's human body; the key is that voiceprint recognition based voice-tracking can effectively prevent the individual from enabling decoupling physically between the individual and his/her specified positioning communication device to escape electronic monitoring, hence the geolocations and movement trace of the positioning communication device are reliably regarded as those of the individual's human body.

In the following sections, the drawings and embodiments are combined to further describe the present invention.

In FIG. 1, the cross-monitoring system 1 of the present invention is comprised of at least the application server 10, the positioning communication device 20, the administration operation terminal 30, the individual 40 to be monitored, and the supervisory staff 50; among them, the application server 10 includes the subsystem 101 for data communication service, the subsystem 102 for voice communication service, the subsystem 103 for system administration service, the subsystem 104 for information storage service, the subsystem 105 for voiceprint recognition service, the subsystem 106 for speech content recognition service, the subsystem 107 for geographic information service and the interconnect interface 108 between the subsystems.

The positioning communication device and application server are joined through the first link network 11. The administration operation terminal and application server are joined through the second link network 12.

Among them, the positioning communication device, which has a unique network ID (for example, the mobile phone number) and integrates the positioning module and data/voice communication module in a single hardware device, is attached to the surface of the individual's human body or held closely by the individual; the positioning communication device combines with wireless communication network service to acquire its location information and carry out data communication and interactive voice communication.

The application server can be centrally deployed or geographically distributed on data and voice communication networks; it can be a physical server comprised of a single computer or a virtual server comprised of multiple computers coordinated through network connection (for example, a centralized or distributed computer duster through network connection); it can provide the following services: data communication, voice communication, system administration, information storage, voiceprint recognition, speech content recognition, and/or geographic information service. In practical applications, if it's desirable to have more flexible and dynamic voice prompts, it can also choose to integrate additional text speech synthesis function.

The administration operation terminal works as a client to form the service architecture of Browser-Server or Client-Server together with the application server; through the administration operation terminal, the supervisory staff can manage the personal information of the individual, configure the monitoring scheme, configure alarm-triggering conditions, alarm-delivering means and alarm-receiving destinations, push notification and command message, receive event notification, observe the geolocation and movement trace of the individual, review the statistical analysis report on the individual, and/or adjust the monitoring scheme for the individual based on his/her performance.

The first link network helps transmit and coordinate voice communication and data communication involving the individual, participate in the location-tracking and/or voice-tracking service. The second link network helps transmit and transfer data communication and/or voice communication involving the supervisory staff, participate in system control and management, display of geolocations and movement trace of the individual, and/or presentation of overall tracking report including non-compliance with restrictions. The first link network can be wireless communication or telephony network; the second link network can be wired or wireless network of WAN (Wide Area Network) or LAN (Local Area Network).

Specifically, implementation of the location-tracking process can be described as follows:

the positioning communication device and/or wireless communication network service participate in the acquisition of the location-defining information and network ID of the positioning communication device, which are transmitted over the wireless communication network; the subsystem for data communication service receives the location-defining information and network ID, parses the location-defining information to get its geolocation and positioning timestamp, queries the time and location related movement restrictions imposed on the individual with his/her user ID uniquely corresponding to the network ID, determines the status of non-compliance with the restrictions by comparing the positioning information with the movement restrictions, deliver the location-tracking result to the subsystem for information storage service for it to be saved in a repository; if the location-tracking result triggers the alarm conditions, send out an alarm message to its destinations.

The implementation of the voice-tracking process can be described as follows:

through the positioning communication device and wireless mobile communication network, the network ID of the positioning communication device can be retrieved, and the man-machine interactive voice dialogue process can be established between the individual and the subsystem for voice communication service; in the process of voice dialogue, the individual provides oral answer by voice input in response to system request or random prompt, the positioning communication device collects and transmits the voice input, the subsystem for voice communication service receives and delivers the voice input to the subsystems for voiceprint recognition service and speech content recognition service; the subsystem for voiceprint recognition service carries out voiceprint recognition on the voice input to authenticate the biometric identity of the individual, and sends the voiceprint authentication result to the subsystem for information storage service; if the individual fails to pass voiceprint authentication, the system can trigger an alarm; the subsystem for speech content recognition service carries out speech recognition or identification on the voice input, verifies whether the voice input matches the system prompt or request so as to determine whether the recorded voice input came from playback of the recorded audio or live speech of a person who is present at the location of the positioning communication device, and sends the speech recognition result of the voice input to the subsystem for information storage service; if playback fraud is detected, the system can trigger an alarm; the network ID, voiceprint authentication result and/or speech recognition result can be utilized to determine whether the individual holds his/her specified positioning communication device; the final voice-tracking result is handed to the subsystem for voice communication service which online plays back the result to the individual and closes the man-machine voice dialogue process.

In the man-machine interactive voice dialogue process, the pre-recorded audio files are used to compose the system voice prompts or requests as well as the voice-tracking results for playback; in real-world applications, if its desirable to have more flexible and dynamic audio data for playback, the text speech synthesis service can be integrated into the system to generate these dynamic audio data for playback at run-time.

The network ID of a positioning communication device can be retrieved in the following ways:

(1) In the case that the individual initiates a voice call actively via a positioning communication device, the subsystem for voice communication service can automatically detect and identify the network ID of the positioning communication device; the user ID representing the individual can be queried through the subsystem for information storage service based on the unique binding relationship between the network ID and the user ID.

(2) In the case that the subsystem for voice communication service initiates a voice call, a specific individual is selected as the target of the voice dialogue at first, the subsystem for information storage service retrieves the network ID of the positioning communication device corresponding to the selected individual from a repository by his/her user ID, the subsystem for voice communication service makes an outbound voice call to the positioning communication device with the retrieved network ID.

The existing electronic monitoring systems based on positioning technologies have a common problem—"identify only the device for tracking a person, but never identify the person holding the device"; an important method to solve this problem is the use of biometrics for human identity authentication, but voice biometric (voiceprint) recognition is the only biometric technology available for remote security control in non-contact mode via the telephony network.

Voice biometrics, also known as speaker recognition, commonly known as the voiceprint recognition, is a biometric method to automatically identify a speaker based on the physiological and behavioral characteristics of the speaker's pronunciation.

Figure 2:
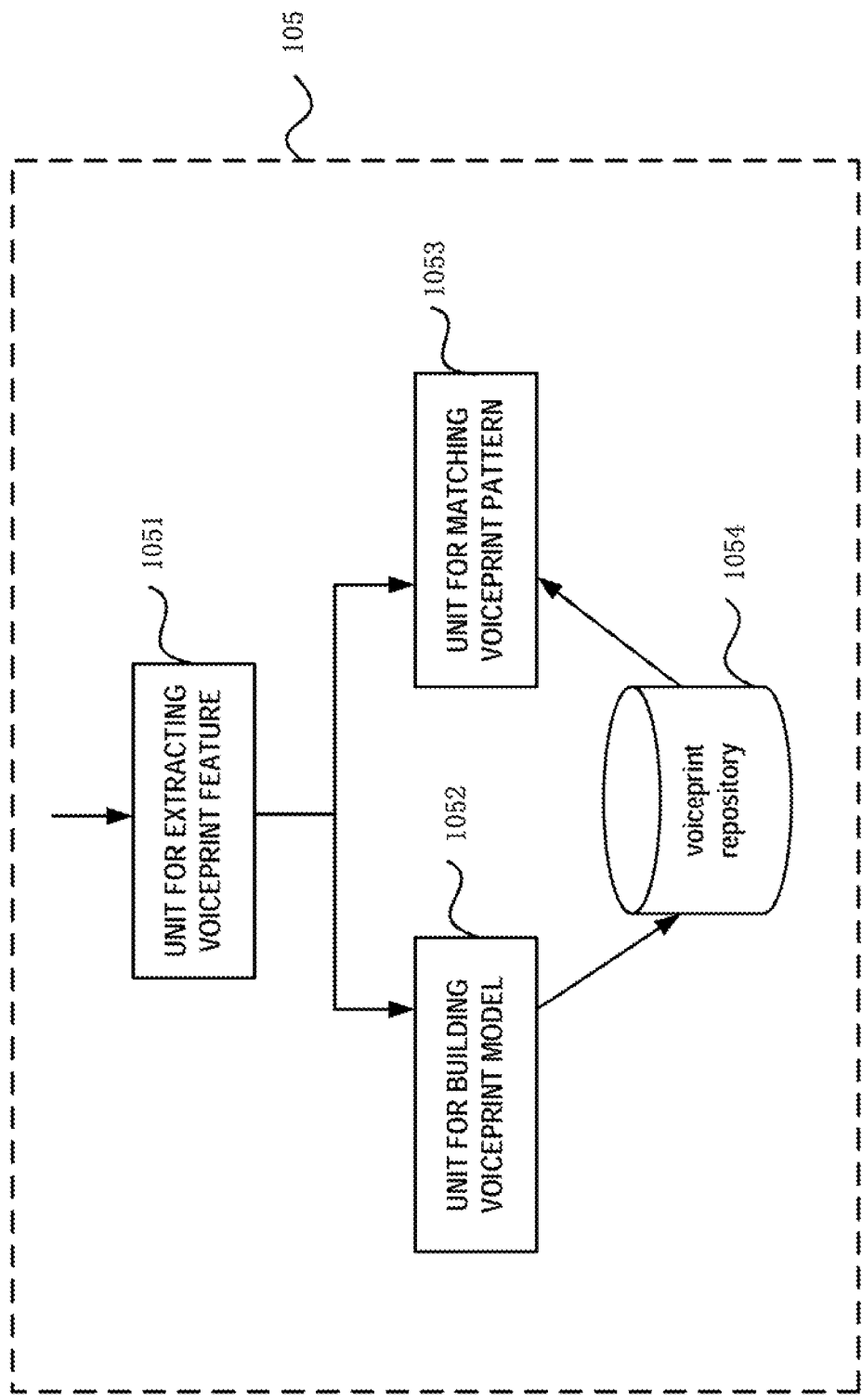
FIG. 2 illustrates an example voiceprint authentication subsystem of the application server in an embodiment of the present invention.

Voiceprint recognition provides the security comparable with other biometric technologies (such as fingerprint, hand geometry and iris); furthermore, it requires no special equipment; just the telephone, cell phone or personal computer with microphone can well meet the need of voice-collecting, thus the cost of the voice-collecting devices is low;

Voiceprint recognition also has nothing to do with speaking language and dialect accent/tone, does not involve privacy issues, can adapt to larger popularity; it's easier and more convenient to acquire and transmit sound signals remotely, voice biometrics is unique and good at the identity recognition for telecommunication and network-based applications;

FIG. 2 gives the authentication process with use of voiceprint recognition:

The subsystem 105 for voiceprint authentication service includes the unit 1051 for extracting voiceprint feature, the unit 1052 for building voiceprint model, the unit 1053 for matching voiceprint pattern, and the voiceprint repository 1054.

The unit 1051 for extracting voiceprint feature is used to remove invalid audio clips (e.g. silence and noise, etc.) and perform voice digital signal processing on the preprocessed voice input of the individual, extract the voiceprint feature sequence for subsequent voiceprint modeling or pattern-matching processes, wherein the voiceprint feature characterizes the parameters of human articulators and the speaking manner or characteristics of the individual.

The unit 1051 for extracting voiceprint feature is the module shared between the unit 1052 for building voiceprint model and the unit 1053 for matching voiceprint pattern.

The unit 1052 for building voiceprint model is used to build a specific voiceprint model of the individual based on the voiceprint feature sequence, which was extracted from the individual's voice samples for the voiceprint enrollment by the unit 1051 for extracting voiceprint feature.

In order to fully characterize the personalized information in the individual's speaking, the voiceprint-modeling approach can be based on a single type of classifier or multiple types of classifiers; commonly used classifiers can include neural networks (ANN), support vector machine (SVM), probability and statistics (HMM/GMM-UBM), vector quantization (VQ), dynamic time warping (DTW) and so on.

The unit 1053 for matching voiceprint pattern uses the voiceprint feature sequence extracted from the individual's authentication voice input to compute its similarity score against the voiceprint model corresponding to the user ID claimed by the individual, and determine whether to accept or reject the individual's identity based on preconfigured decision thresholds in order to complete the authentication process based on voice recognition technology.

In the voiceprint authentication process, in order to enhance security by preventing audio-playback-fraud, speech recognition on all or part of the voice input for authentication can optionally be done to determine whether the voice input matches the system request or random prompt, thus verify whether the voice input came from the live speech of a person who is present at the location of the voice input device; in order to adapt to changes in the voice channel and the aging of the human voice and other factors, the voice input for authentication can further be used to update or refine the voiceprint model.

Figure 3:
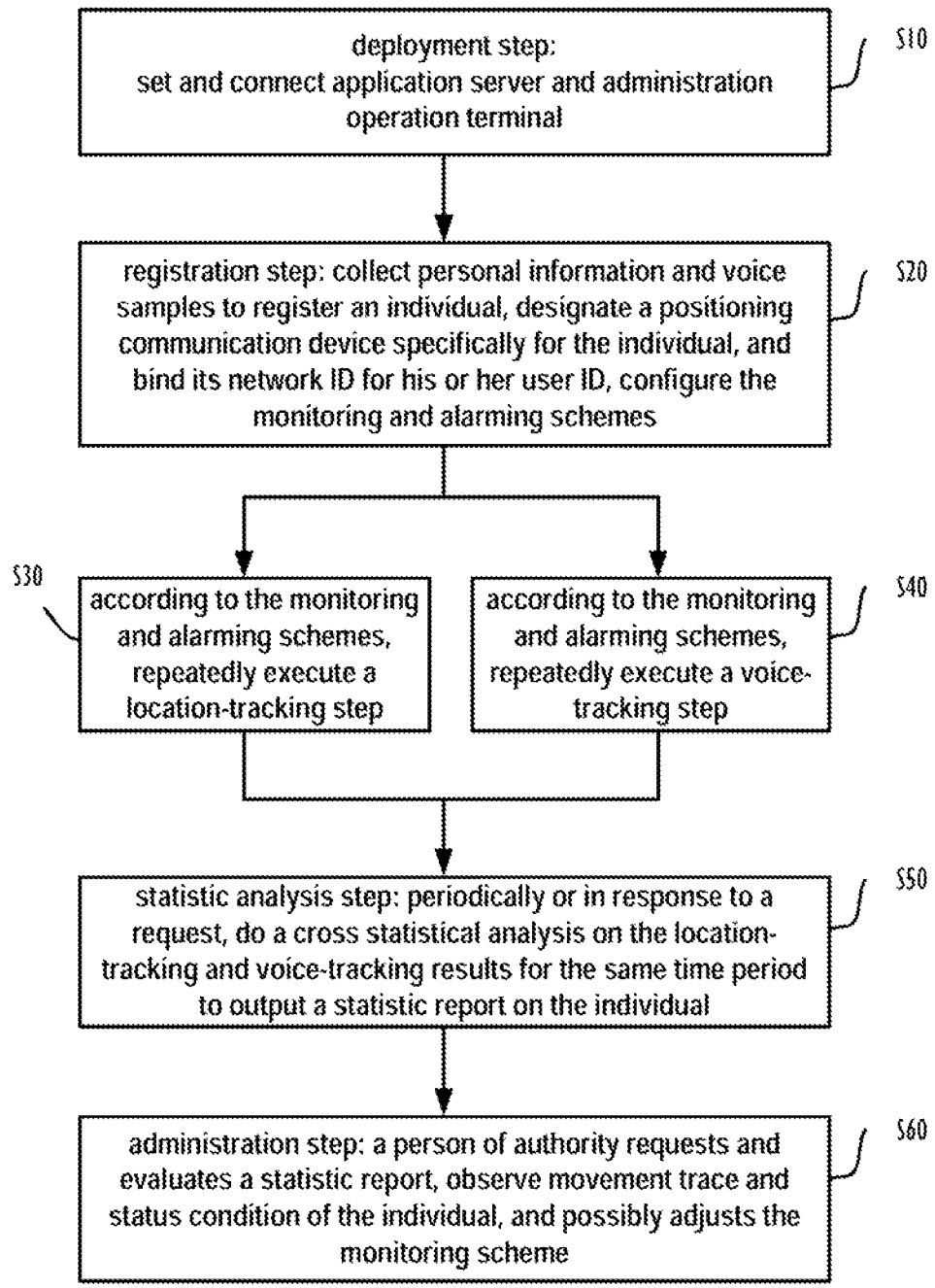
FIG. 3 illustrates, in flowchart form, a cross-monitoring method according to one embodiment of the present invention.

FIG. 3 gives the block diagram of the workflow of the monitoring method of the present invention which may work as follows:

In step S10, deploy the electronic monitoring system, connect and set up the application server and the administration operation terminal to form the service architecture of Browser-Server or Client-Server;

In step S20, register an individual with the monitoring system, including: collecting the individual's personal information and voice samples for the voiceprint enrollment, registering the individual's unique user ID, building the individual's voiceprint model, designating a positioning communication device specifically for the individual, binding the individual's user ID and the network ID of the positioning communication device together, and configuring a monitoring scheme and an alarming scheme, and so on;

In step S30, in accordance with the monitoring and alarming schemes for the individual, execute repeatedly a location-tracking step for the positioning communication device (see FIG. 4), and save the location-tracking results;

In step S40, in accordance with the monitoring and alarming schemes for the individual, execute repeatedly a voice-tracking step for the individual based on voiceprint recognition and/or speech recognition (see FIG. 5), and save the voice-tracking results;

further, according to the monitoring and/or alarming schemes of the individual, the location-tracking step and voice-tracking step may be executed in parallel mode and/or in interactively-linked mode.

In step S50, periodically or in response to a report request, do a cross statistical analysis on the location-tracking and voice-tracking results generated within the same time period, infer the movement trace of the individual from the past status of whether or not the individual held his or her specific positioning communication device, and the trace of the positioning communication device, finally compile a complete report representing the individual's movement trace and non-compliance with restrictions on movement; said report may be used together with electronic map for a supervisory staff to review the performance and movement of said individual, and/or adjust the monitoring and alarming schemes for the individual.

Figure 4:
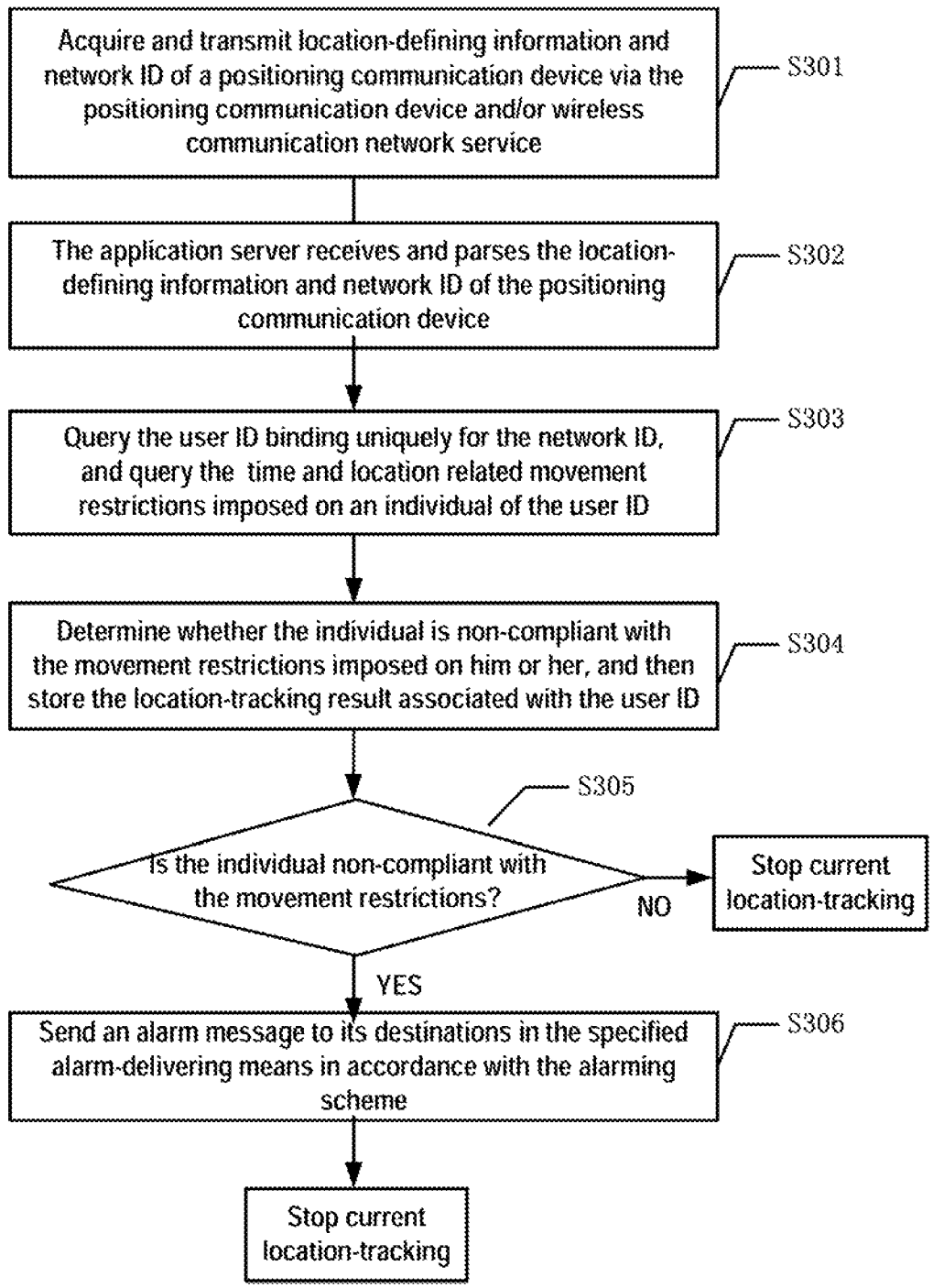
FIG. 4 illustrates, in flowchart form, an example location-tracking workflow according to one embodiment of the present invention.

FIG. 4 gives the block diagram of the workflow of the location-tracking process executed in step S30 which may work as follows:

in step S301, by the positioning communication device and/or wireless communication network service, acquire and transmit the location-defining information and network ID of the positioning communication device according to selected location-defining technologies;

in step S302, the application server receives the network ID and location-defining information, and parse the location-defining information to extract the geolocation and positioning timestamp of the positioning communication device;

in step S303, query the user ID binding for the network ID, and query the time and location related movement restrictions imposed on an individual of the user ID;

in step S304, compare said geolocation and positioning timestamp with the time and location related movement restrictions to determine whether the individual is non-compliant with the movement restrictions imposed on him or her, and then store the location-tracking result associated with the user ID, wherein the location-tracking result includes the network ID, geolocation, positioning timestamp, and/or status of non-compliance with the movement restrictions;

in step S305, make conditional decision, take different action steps based on the status of non-compliance with the restrictions: if non-compliance with the restrictions has occurred, an alarm is triggered and optionally send the alarm message to its destinations in the specified alarm-delivering means, and then close current location-tracking step; otherwise, directly close current location-tracking step.

Figure 5:
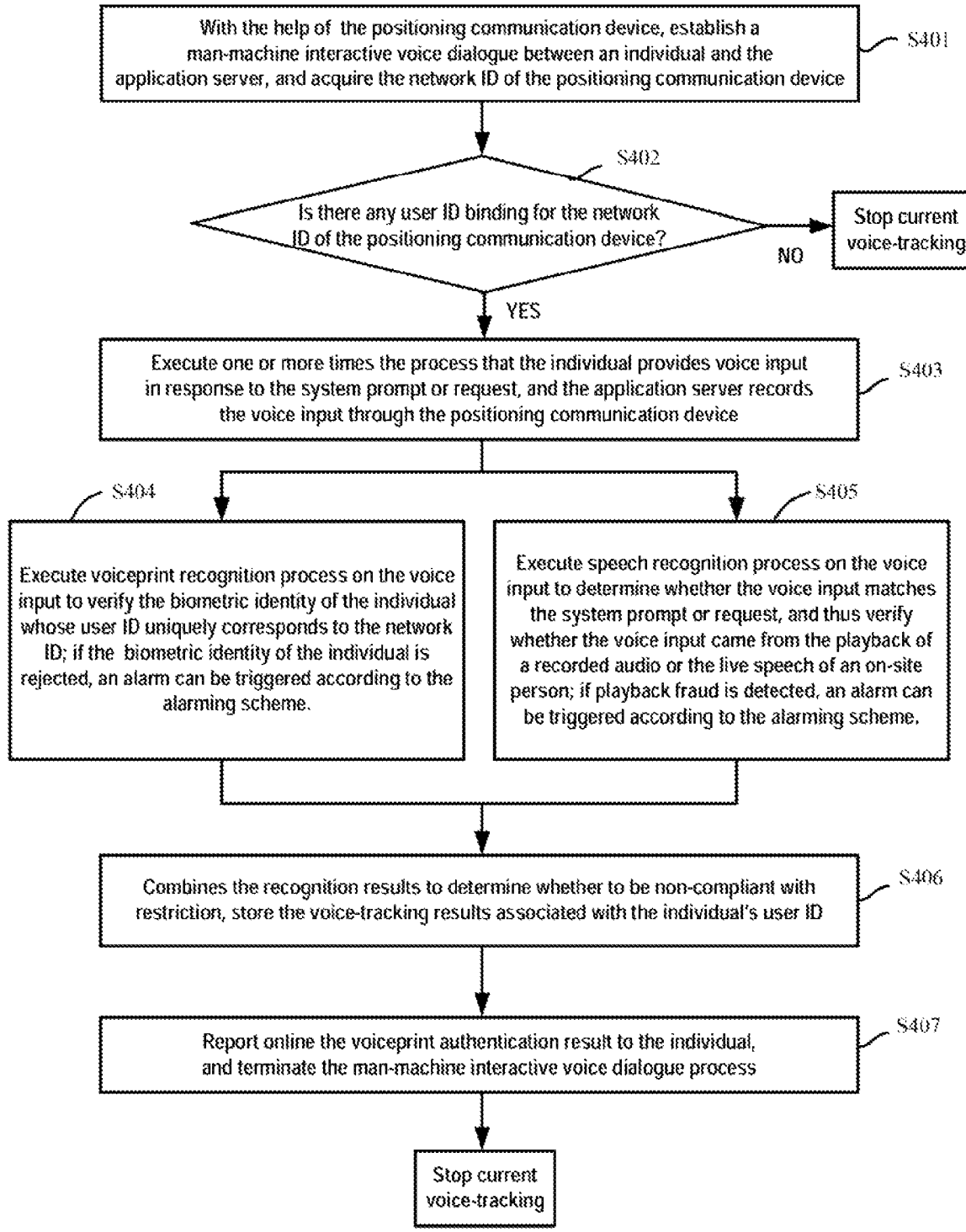
FIG. 5 illustrates, in flowchart form, an example voice-tracking workflow according to one embodiment of the present invention.

FIG. 5 gives the block diagram of the workflow of the voice-tracking process executed in step S40 which may work as follows:

in step S401, with the help of a positioning communication device, establish a man-machine interactive voice dialogue between the individual and the application server, wherein the network ID of the positioning communication device is acquired; according to the monitoring scheme, the man-machine voice dialogue can be initiated by the individual making a voice call to the application server, or by the application server making an outbound call to the individual via his or her positioning communication device.

In practical applications, the initiation mode of voice dialogue by the random outbound calls from the system to the individual is more effective in preventing the phenomenon that the individual intentionally enables decoupling physically between the individual and the device for tracking the individual.

Step S402 is a decision-making step, but it is applicable only for the case that a man-machine voice dialogue process is initiated by the individual's active voice call to the application server; the step S402 can be directly skipped for the case that the individual answers a voice call passively from the application server;

In step S402, inquire whether there exists any user ID uniquely binding for the network ID of said positioning communication device; if there is no such user ID, interrupt the process of man-machine voice dialogue, and close current voice-tracking process in advance; otherwise, continue with the next step.

In step S403, with the help of the positioning communication device, the individual provides his or her voice input in response to the system prompt or request, the application server records the individual's voice input; in order to collect more voice data from the individual and more effectively prevent the audio-playback fraud, the process comprising system prompt or request, the individual's oral response, and voice recording can be repeated multiple times; after collecting sufficient voice data from the individual, step S404 and/or S405 is executed to do voiceprint recognition and/or speech content recognition on the recorded voice input, respectively.

In step S404, execute voiceprint recognition process on the recorded voice input, verify the biometric identity of the individual uniquely corresponding to said network ID; if the identity is rejected, the alarm can optionally be triggered in accordance with the alarming scheme.

In step S405, optionally execute speech content recognition process on the recorded voice input to determine whether the voice input matches the system prompt or request, and thus verify whether the voice input came from the playback of a recorded audio or the live speech of a person who is present at the location of the positioning communication device; if the audio-playback fraud is detected, the alarm can optionally be triggered in accordance with the alarming scheme.

In step S406, combine the recognition results generated in step S404 and/or S405, to determine the status of non-compliance with restriction that the individual shall stay together with the positioning communication device designated for the individual; store current voice-tracking result which is associated with the individual's user ID, wherein said voice-tracking result includes network ID, status of non-compliance with restriction, voice-tracking timestamp, voiceprint recognition result and/or speech content recognition result.

In step S407, report online the voiceprint authentication result to the individual, terminate the man-machine interactive voice dialogue process, and close current voice-tracking process.

In the above technical solution, the location-defining technologies, which may be based on positioning by satellites, positioning by base stations of mobile communication network, and/or positioning by wireless Wi-Fi, etc., are already the existing mature technologies; voiceprint recognition (i.e. voiceprint authentication) itself is also the existing technology; there are a number of patent publications on the voiceprint authentication or voiceprint recognition, such as CN200710041252.9—"online payment method and system based on voiceprint authentication", CN200410086190.X—"voiceprint authentication system and voiceprint authentication program" and so on; these publications as background knowledge can be used to help understand the technological solution of present invention, therefore, the workflow, mechanism and principle on voiceprint recognition and location-defining technologies are not described here in detail.

All the steps, modules, units or system in the above technical solution or manual drawings are explained in the general technology terms and description methods of this invention-related technical field; these terms and methods are not described in detail here, because without any creative work, a technical person in this field can realize the same or similar technical effects, and achieve the same objective in implementing the technical solution of the present invention after fully understanding and mastering the method, thought, system architecture and topology on how the present invention solves the technical problem.

INDUSTRIAL APPLICABILITY

While tracking an individual, the existing wireless/electronic location-tracking technology has its defect that it can identify only the tracking device but not the individual who holds the tracking device; however, as a biometric technology controllable remotely in non-contact and secure way, voiceprint recognition just has a right advantage that it can identify only the individual but not the device; thus the technical solution of the present invention can truly track the locations of the individual by integrating the two mutually-complementary technologies.

The technical solution of the present invention fully converges voiceprint recognition and location tracking technologies, not only track the individual through the positioning communication device indirectly, but also do voice-tracking on the individual through voiceprint authentication; therefore, the present invention can effectively prevent the individual from enabling decoupling physically between the individual and the device for tracking him or her in order to escape the electronic monitoring, and overcome the technical problem, "identify only the device but not the person holding the device", of the existing location-tracking based electronic monitoring systems.

What is claimed is:

1. A cross-monitoring method based on voiceprint recognition and location tracking, the method comprising:
    collecting personal information and voice samples of an individual to register a user ID for the individual and build a voiceprint model for the individual;
    designating the individual a positioning communication device for tracking the individual;
    configuring a monitoring scheme and an alarming scheme;
    selecting a unique network ID fully representing the positioning communication device;
    establishing a unique one-to-one corresponding between the network ID and the user ID to bind the device and the individual together;
    for the positioning communication device, executing repeatedly a location-tracking step in accordance with the monitoring scheme and the alarming scheme, wherein the location-tracking result is processed and stored in a repository;
    for the individual, executing repeatedly a voice-tracking step based on voiceprint recognition in accordance with the monitoring scheme and the alarming scheme, wherein the voice-tracking result is processed and stored in the repository; and
    for the individual and the positioning communication device designated for tracking the individual, conducting a cross statistical analysis on the location-tracking and voice-tracking result records generated within the same time period to compile an overall tracking report on the individual's performance for the specified time period in response to a report request or periodically, wherein the overall tracking report eventually reflects the individual's movement trace and actual status of non-compliance with the movement restrictions imposed on the individual so that a supervisory staff can review the performance and movement trace of the individual and/or adjust the monitoring and alarming schemes for the individual.

2. The cross-monitoring method of claim 1, wherein the monitoring scheme comprises some or all of the following items of information:
    a time schedule and frequency of recurrence of the location-tracking step;
    one or more choices on whether the monitoring system requests a location-defining information actively or receives a location-defining information passively;
    a set of time and location related movement restrictions imposed on the individual;
    a time schedule and frequency of recurrence of the voice-tracking step;
    one or more choices on whether the individual initiates a voice call actively or answers a voice call passively for voiceprint recognition;
    one or more choices on mode and content of system prompt or request versus the individual's oral answer;
    one or more demands on parallel or interactively-linked execution of the location-tracking and voice-tracking steps; and
    a time schedule to conduct cross statistical analysis on the monitoring results to compile a tracking report;
    wherein the alarming scheme comprises alarm-triggering conditions, alarm-delivering means, and alarm-receiving destinations;
    wherein if personalized monitoring and alarming schemes are not configured for the individual, then default monitoring and alarming schemes are used for the individual.

3. The cross-monitoring method of claim 1, wherein in accordance with the monitoring scheme and the alarming scheme, the location-tracking step and the voice-tracking step can be executed in parallel mode or in interactively-linked mode.

4. The cross-monitoring method of claim 1, wherein the location-tracking step further comprises:
    acquiring the network ID and geolocation of the positioning communication device as well as the positioning timestamp through location-defining technological methods;
    querying the individual's user ID that is uniquely corresponding to the network ID according to the binding relationship between the user ID and network ID;
    querying the time and location related movement restrictions imposed on the individual of the user ID;
    determining whether the geolocation is compliant with the movement restrictions imposed on the individual, wherein an alarm message is optionally sent to its destinations in the specified alarm-delivering means if the non-compliance with the restrictions triggers the alarm condition; and
    storing the location-tracking result in the repository where the location-tracking result record is associated with the user ID;
    wherein the location-tracking result comprises the network ID, geolocation, positioning timestamp and/or the status of alarming and non-compliance with the movement restrictions;
    wherein the location-defining technological methods comprises satellite, positioning, base station positioning over wireless mobile communication network, hybrid positioning of satellites and mobile base stations, and/or wireless Wi-Fi positioning;
    wherein the location-defining technological methods are enabled via the positioning communication device and/or wireless communication network service.

5. The cross-monitoring method of claim 1, wherein the voice-tracking step further comprises:
    establishing a man-machine interactive voice dialogue;
    acquiring the network ID of the positioning communication device held by the individual;
    recording the individual's voice input in response to the system prompt or request;
    executing voiceprint recognition process on the recorded voice input to verify the individual's biometric identity;

optionally adding an extra step to execute speech recognition process on the recorded voice input to determine whether the individual's voice input matches the system prompt or request in the man-machine interactive voice dialogue in order to verify that the voice input originated from the live speech of a person who is present at the location of the positioning communication device;

utilizing the network ID and voiceprint recognition result and/or speech recognition result to determine whether the individual on-site is holding the positioning communication device designated for tracking the individual, and determine the status of the individual's non-compliance with the restriction that the individual shall stay together with his or her tracking device;

optionally sending an alarm message to its destinations in the specified alarm-delivering means if the non-compliance with the restriction triggers the alarm condition; and storing the voice-tracking result in the repository where the voice-tracking result record is associated with the user ID;

wherein the voice-tracking result further comprises the network ID, monitoring timestamp, the status of alarming and non-compliance with the restriction, the voiceprint recognition result and/or speech content recognition result.

6. The cross-monitoring method of claim 4, wherein the execution order between sending the alarm-message and storing the tracking result doesn't matter in the location-tracking and voice-tracking steps.

7. The cross-monitoring method of claim 1, wherein the voiceprint recognition is classified as two phases: voiceprint enrollment and voiceprint verification;

wherein the voiceprint enrollment phase comprises:
  extracting voiceprint feature, wherein digital speech signal processing is performed on the individual's voice samples to extract a voiceprint feature sequence that characterizes the physiological and behavioral characteristics of the individual's speaking; and
  building voiceprint model, wherein the voiceprint feature sequence extracted from the voice samples is utilized to build the voiceprint model that characterizes the characteristics of the individual's speaking;

wherein the voiceprint verification phase comprises:
  extracting voiceprint feature, wherein digital speech signal processing is performed on the individual's voice input to extract a voiceprint feature sequence that characterizes the physiological and behavioral characteristics of the individual's speaking; and
  matching voiceprint pattern, wherein the voiceprint feature sequence extracted from the voice input is utilized to compute its similarity score against the voiceprint model of the individual so as to authenticate the individual.

8. A cross-monitoring system based on the voiceprint recognition and location tracking, involving a monitored individual and a supervisory staff, wherein the individual is monitored automatically by the cross-monitoring system and supervised by the supervisory staff, and the supervisory staff manages the individual and the operation of the cross-monitoring system, the cross-monitoring system comprising:

setting up a positioning communication device having a unique network ID, wherein the positioning communication device is attached onto a body surface of the individual or carried closely by the individual as a personal portable device for location-defining, data communication and voice communication processes, wherein the positioning communication device of different network ID is designated for different individual;

setting up an application server comprising a processing unit, a storage unit and a communication unit to provide voice communication, data communication, information processing and storage, system management, voiceprint recognition and/or speech content recognition; and setting up an administration operation terminal as a client, wherein the administration operation terminal combines together with the application server to form the service architecture of Browser-Server or Client-Server;

wherein the supervisory staff may operate the monitoring system and manage the individual via the administration operation terminal which is connected to the application server;

wherein, through a first link network, the positioning communication device and application server are joined to execute the location-tracking and voice-tracking steps in the cross-monitoring method of claim 1 for the individual and the positioning communication device designated for tracking the individual, wherein in response to a cross-monitoring request, the application server further conducts a cross statistical analysis on the location-tracking and voice-tracking results generated within the same time period to compile an overall tracking report on the movement trace and performance of the individual for the supervisory staffs review;

wherein, through a second link network, the administration operation terminal and application server are joined to execute any of the following work tasks said in the cross-monitoring method of claim 1: managing an individual's personal information, designating a positioning communication device specifically for the individual, configuring the monitoring scheme, configuring the alarming scheme comprising the alarm-triggering conditions, alarm-delivering means, and alarm-message destinations, sending notification and command messages, receiving event notification, and observing the geolocations and movement trace of the individual and/or outputting the monitoring report by cross statistical analysis;

wherein the first link network is used for voice communication and data communication involving the individual;

wherein the second link network is used for data communication and/or voice communication involving the supervisory staff.

9. The cross-monitoring system of claim 8, wherein the positioning communication device, being involved in the location-tracking process, acquires and transmits the positioning information, and/or receives a notification or command message from the application server;

wherein the positioning communication device, being involved in the voice-tracking process, plays back the system prompt or request, collects and transmits the voice input of the individual's oral response to the system prompt or request during a man-machine interactive voice dialogue process;

wherein the application server is either a server comprised of a single physical computer, or a virtual server comprised of a plurality of physical computers working together harmonically through network connections;

wherein the application server comprises one or more service subsystems, and may further optionally provide such auxiliary services as text-to-speech synthesis, and geographic information services;

if the application server is a virtual server comprising a plurality of physical computers, the plurality of physical computers can be located centrally in the same local area network, or be also deployed in geographically distributed networks over network connections, they are controlled and coordinated by the system management service;

wherein the first link network is involved in the location-tracking and/or voice-tracking process;

wherein the second link network is involved in the system control and management, transmits the geolocations, movement traces, the status of non-compliance with the restrictions, and/or the statistical report on the individual.

10. The cross-monitoring system of claim 9, wherein the man-machine interactive voice dialogue involves the individual, the positioning communication device and the application server, and allows a voice call to be initiated in two modes from the point of view of the individual: active call-making mode and passive call-taking mode;

in the active call-making mode, the individual actively initiates a voice call to the application server via the positioning communication device bound for the individual, the application server then accepts the inbound voice call, detects and identifies the network ID of the positioning communication device;

in the passive call-taking mode, the application server queries the network ID uniquely corresponding to the individual's user ID, makes an outbound voice call to the positioning communication device of the network ID; then, the individual holding the positioning communication device accepts passively the voice call from the application server.

11. The cross-monitoring system of claim 8, wherein the application server, based on different positioning technological methods, obtains the geolocation information of the positioning communication device in one or more of the following ways:

the positioning communication device acquires its latest geolocation information, further transmits the geolocation information to the application server over the first link network;

or the positioning communication device acquires its latest signal data of wireless communication which can be used to derive its geolocation information indirectly, further transmits the signal data to the application server over the first link network; then, the application server receives the signal data and obtains indirectly the geolocation information of the positioning communication device from the signal data;

or according to the network ID of the positioning communication device, the application server retrieves indirectly the geolocation information of the positioning communication device from the third-party location-defining server which can determine and store the geolocation information of the positioning communication device by a single or hybrid of the positioning technological methods.

12. The cross-monitoring method of claim 2, wherein the interactively-linked execution of the location-tracking and voice-tracking steps is characterized as follows: while executing one of the location-tracking and voice-tracking steps, an alarm event demanding the interactively-linked execution of the two tracking steps is triggered to cause the other step to be executed once subsequently.

13. The cross-monitoring method of claim 1, wherein the movement restriction in the monitoring scheme is specified geographically in term of location range and may possibly be associated with time limit, wherein the movement restriction comprises one or more geolocation points, or even one or more electronic fences with a closed boundary delineated in the electronic map.

14. The cross-monitoring method of claim 1, wherein the alarm-triggering condition in the alarming scheme comprises any one of the following events occurring in the location-tracking step for the positioning communication device: arrival or departure from a specified location, entering or leaving the region of an electronic fence, and staying inside or outside the region of an electronic fence for longer than a specified time limit.

15. The cross-monitoring method of claim 1, wherein the alarm-triggering condition in the alarming scheme comprises any one of the following events occurring in the voice-tracking step for a positioning communication device:

reaching a specified number limit of consecutive failures that the positioning communication device is not available for the outbound voice call initiated by the system;

reaching a specified number limit of consecutive failures that no one at the location of the positioning communication device answers the outbound voice call initiated by the system;

an individual's failure to actively make a voice call to the application server within the specified time range in response to the monitoring request;

audio-playback fraud (that is, speech content recognition helps determine that voice response is not from the live speech of a person at the location of the positioning communication device);

decoupling physically between the individual and the device designated for tracking him or her (that is, voice-print recognition and/or speech content recognition helps determine that the individual doesn't stay together with the specified positioning communication device for tracking the individual).

16. The cross-monitoring method of claim 1, wherein the network ID of the positioning communication device comprises a single device attribute or combination of device attributes uniquely representing the positioning communication device; or the network ID comprises a unique ID which one-to-one corresponds to a single device attribute or combination of device attributes uniquely representing the positioning communication device.

17. The cross-monitoring method of claim 1, wherein the network ID of the positioning communication device is acquired through different and unique device attributes of the positioning communication device while executing the location-tracking step and voice-tracking step.

18. The cross-monitoring method of claim 5, wherein the execution order between sending the alarm-message and storing the tracking result doesn't matter in the location-tracking and voice-tracking steps.

19. The cross-monitoring method of claim 3, wherein the interactively-linked execution of the location-tracking and voice-tracking steps is characterized as follows: while executing one of the location-tracking and voice-tracking steps, an alarm event demanding the interactively-linked execution of the two tracking steps is triggered to cause the other step to be executed once subsequently.

* * * * *